United States Patent [19]

Whitman

[11] 4,186,721
[45] Feb. 5, 1980

[54] SOLAR ENERGY HEAT COLLECTOR

[76] Inventor: William C. Whitman, 3 Fourth St., New Brunswick, N.J. 08901

[21] Appl. No.: 812,812

[22] Filed: Jul. 5, 1977

[51] Int. Cl.² .................................................. F24J 3/02
[52] U.S. Cl. ...................................... 126/430; 126/400
[58] Field of Search ........................ 126/270, 271, 400; 237/1 A

[56] References Cited

U.S. PATENT DOCUMENTS

| | | | |
|---|---|---|---|
| 2,998,005 | 8/1961 | Johnston | 126/270 |
| 3,102,532 | 9/1963 | Shoemaker | 126/270 |
| 3,989,927 | 11/1976 | Erb | 126/400 |
| 4,067,316 | 1/1978 | Brin et al. | 126/271 |
| 4,082,082 | 4/1978 | Harvey | 126/270 |
| 4,119,083 | 10/1978 | Heyen et al. | 126/270 |

*Primary Examiner*—Kenneth W. Sprague
*Attorney, Agent, or Firm*—Robert A. Green

[57] ABSTRACT

The apparatus of the invention includes a heat collector which utilizes a dark-colored, conductive, fibrous heat absorber positioned to receive the sun's rays and to absorb heat therefrom. The apparatus also includes heat-transfer means which passes through or flows over the fibrous heat collector and absorbs heat therefrom. The fibrous heat absorber is a large-area sheet, and it is supported so that it has a generally corrugated contour to increase its effective surface area. The heat transfer means may be air or a fluid.

The apparatus of the invention also includes a heat storage apparatus, which comprises essentially a container of metal-coated material such as eutectic crystals which are in liquid form when the heat of fusion has been absorbed and which are crystalline in form when the heat of fusion is given up and the crystals cool.

5 Claims, 20 Drawing Figures

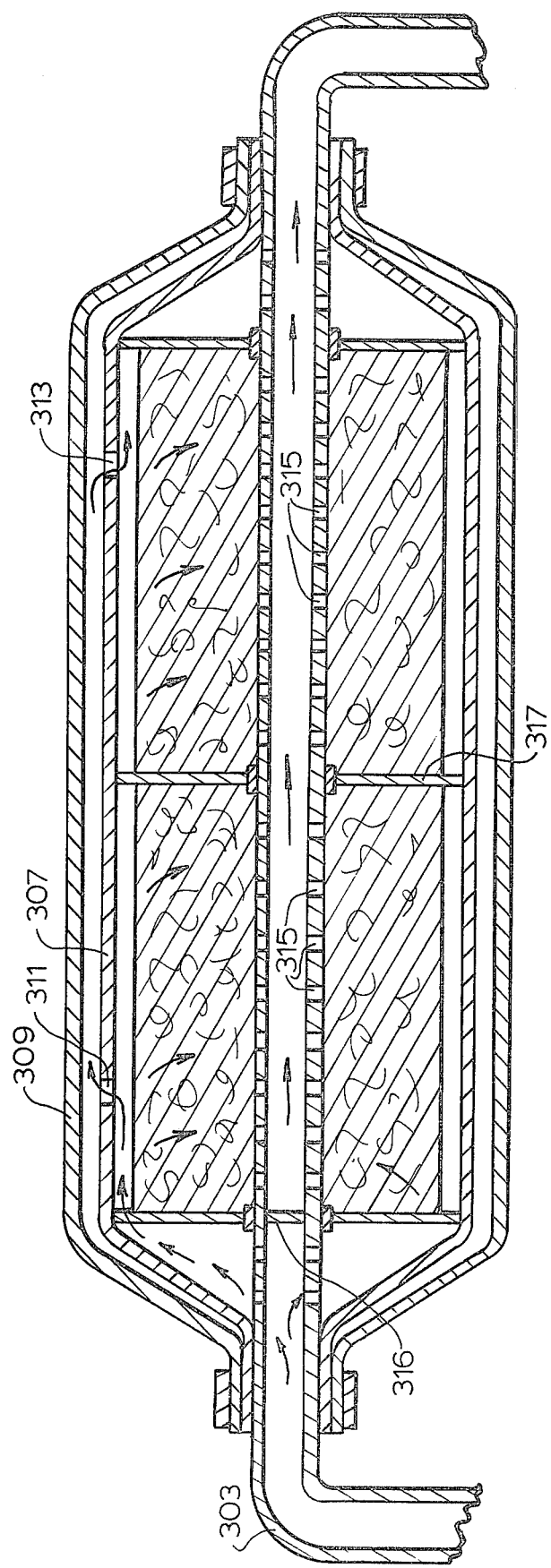

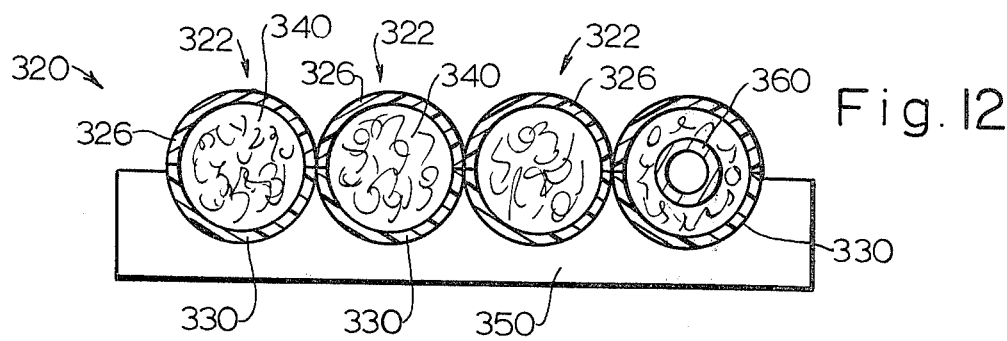
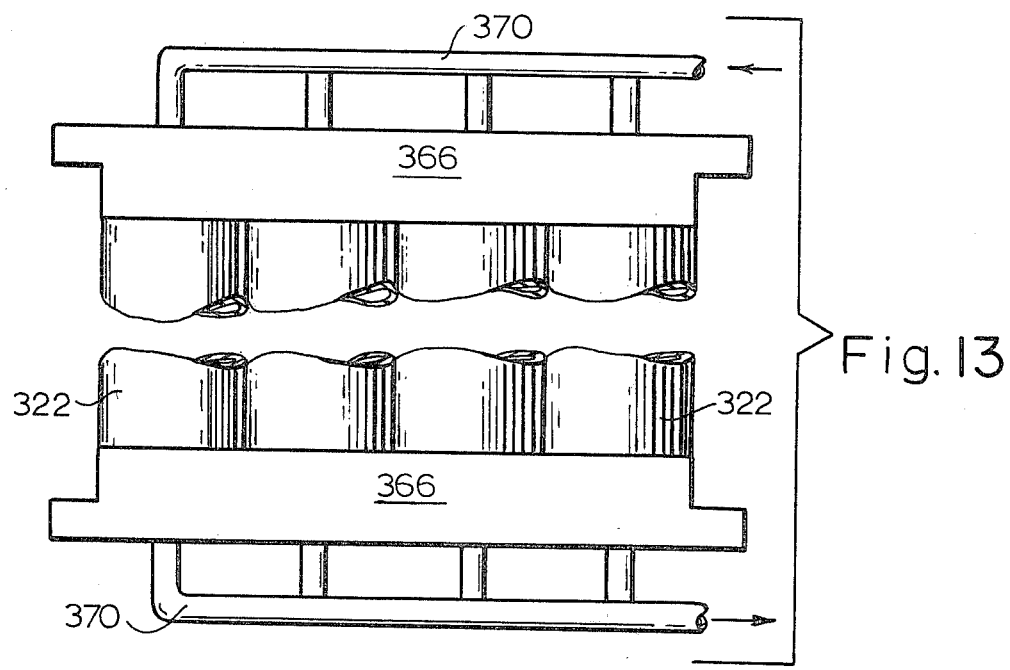
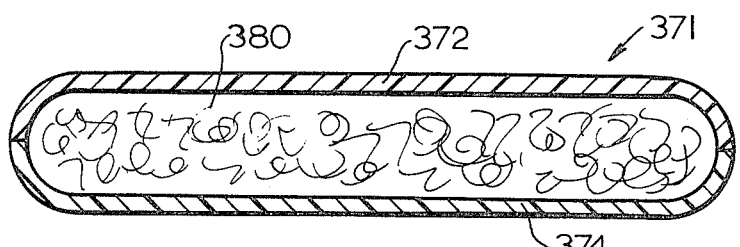

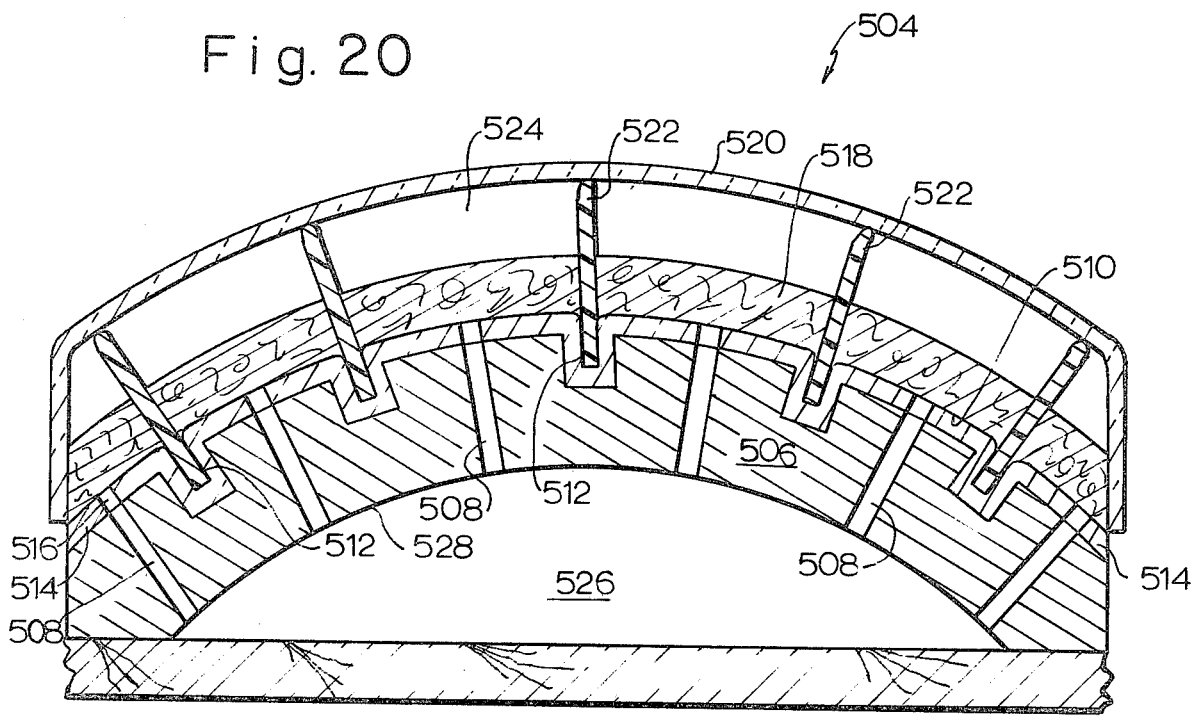

SOLAR ENERGY HEAT COLLECTOR

BACKGROUND OF THE INVENTION

Solar energy heat conversion devices of many forms are known in the art; however, all such known devices utilize heat collectors which are either metallic or of such structure that there is considerable reflection of thermal energy which is thus, in effect, lost to the system. In addition, such systems in general do not provide maximum utilization of the heat-absorbing surface which is available.

Also, in the prior art, the means for storing the collected heat within a building has been undesirably large in size and thus is relatively impractical for the average home.

The present invention solves these problems and provides a solar energy absorber and storage system which is more compact and more efficient than those known in the prior art.

DESCRIPTION OF THE DRAWINGS

FIG. 9 is a sectional view of one of the heat collectors of FIG. 8;

FIG. 12 is a sectional view of another modification of the invention;

FIG. 13 is a plan view of the apparatus of FIG. 12;

FIG. 14 is a modification of the apparatus of FIG. 13;

FIG. 20 is a sectional, elevational view of still another modification of the invention.

DESCRIPTION OF THE PREFERRED EMBODIMENTS

Figure 1:
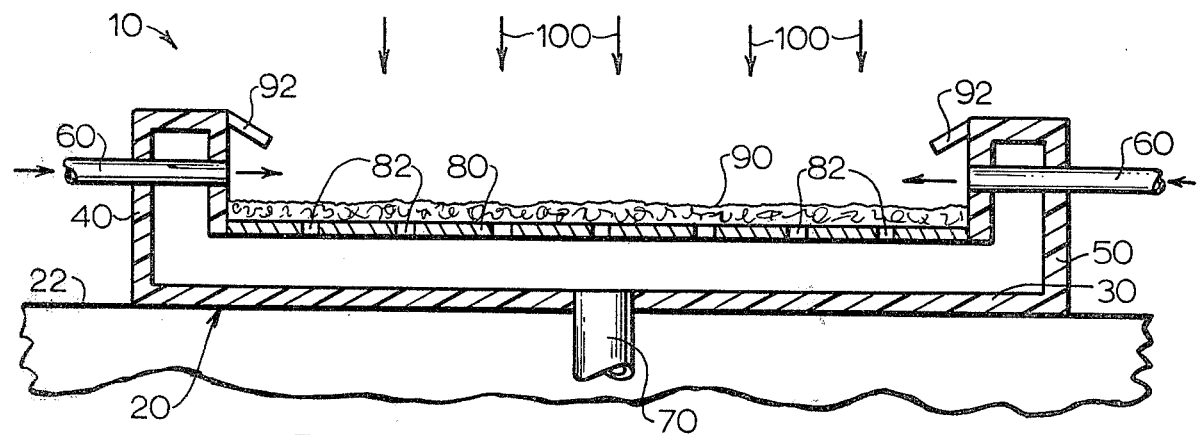
FIG. 1 is a side elevational view, partly in section, of apparatus embodying the invention.

A typical solar energy heat collector system includes a collector mounted on the roof of a building in position to receive the sun's rays. Heat-collecting apparatus 10 embodying the invention is mounted in this manner and includes a generally rectangular frame 20 of any suitable size and shape adapted to be mounted on a roof 22. The frame includes a base 30, side walls 40 and 50, and end walls 52 and 54. A plurality of air or other fluid inlet pipes 60 are mounted in each of the side walls (FIGS. 1 and 2), with an air outlet pipe 70 extending through the base. A flat support member 80 having a large number of apertures 82, through which air can flow, is mounted in the frame 20 spaced from and generally parallel to the base 30, and, according to the invention, on this apertured support member is seated a thermally conductive fibrous heat collector 90. The fibrous heat collector 90 is made of fibers of copper or of any other suitable material and has an appearance and structure similar to steel wool. The heat collector 90 is also preferably black in color. Air baffles 92 may be provided on side walls 40 and 50 to direct the flow of air from pipes 60 into the apparatus 10 and through the heat collector 90.

A glass or other heat-transparent cover (not shown) may be provided covering the frame 20, if desired.

Figure 2:
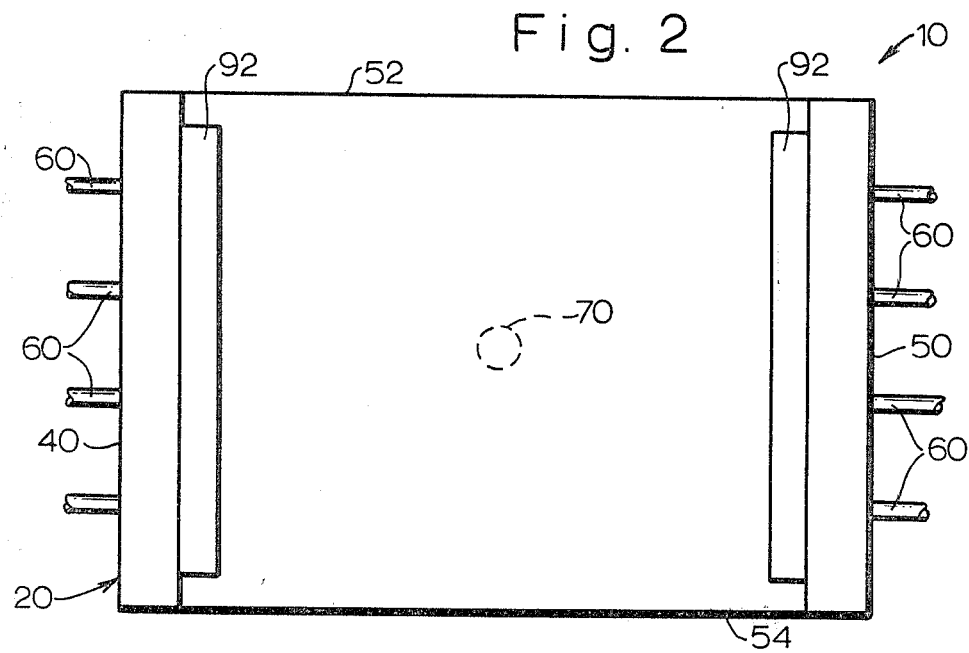
FIG. 2 is a plan view of the apparatus of FIG. 1.

In operation of the apparatus 10 of FIG. 1, the layer of fibrous conductive material 90 absorbs heat from the sun's rays, represented by arrows 100, and air is drawn, by suction, into pipes 60 and across and through the fibrous material 90 to the outlet pipe 70. This air absorbs heat from the layer 90 and carries this heat to a storage chamber to be described.

Figure 3:
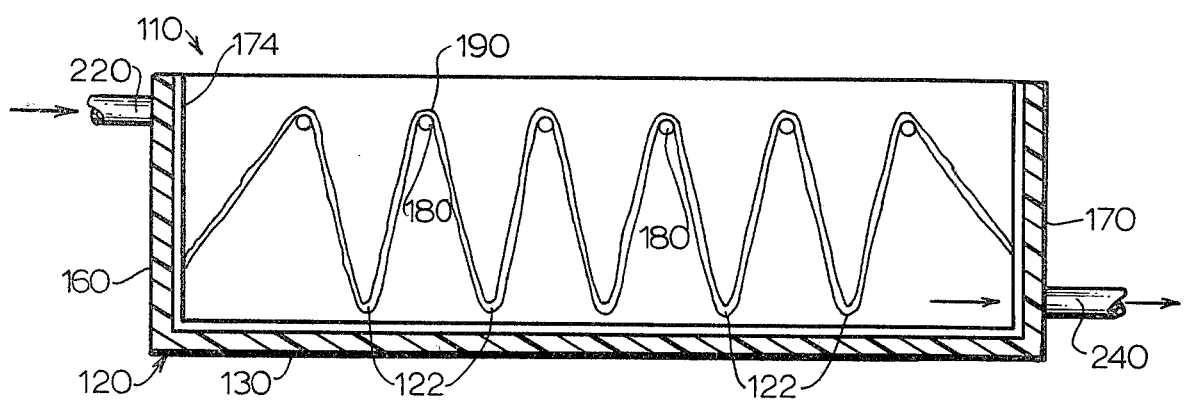
FIG. 3 is a side elevational view of a modification of the apparatuus of FIG. 1.

In a modification of the invention illustrated in FIG. 3, the apparatus 110 includes a generally rectangular frame 120 having a base 130 and opposed upper and lower end walls 140 and 150, and opposed side walls 160 and 170. An optional liner 174 of aluminum-coated Mylar may be provided, lining the frame 120. Support posts or wires 180 extend generally parallel to each other between the end walls 140 and 150, to which they are secured. The heat collector comprises a fibrous sheet 190, like sheet 90, which is placed on, and supported by, the supports 180 in such a way that the sheet assumes a folded or corrugated form, as illustrated in FIG. 3. The liner 174 serves to prevent heat which passes through sheet 190 from reflecting back through the sheet to the outside atmosphere.

Figure 4:
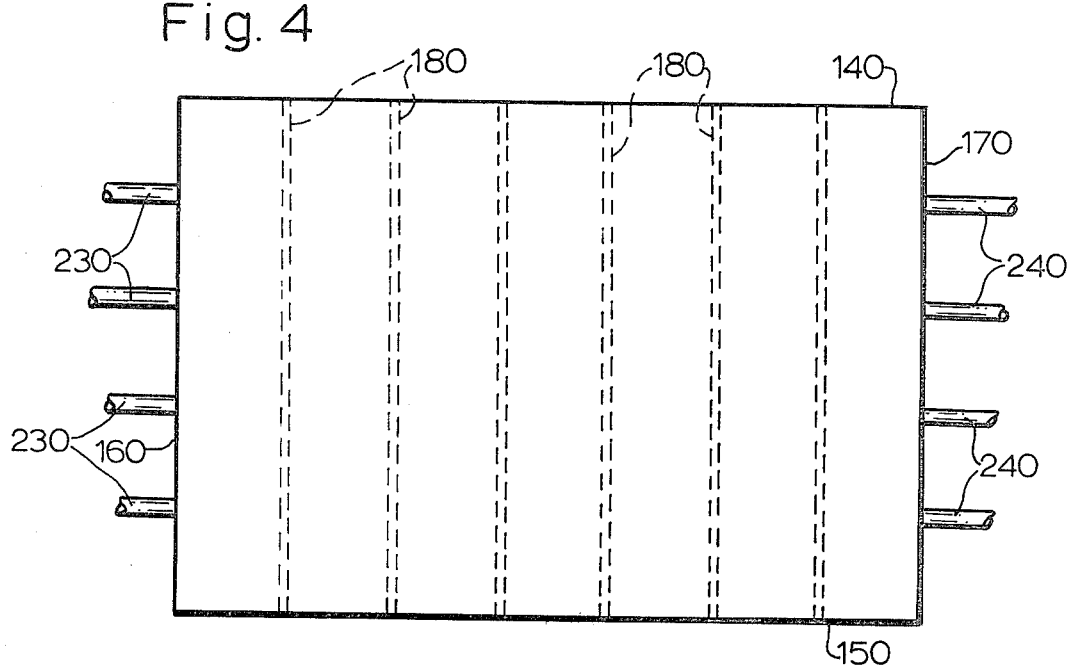
FIG. 4 is a plan view of the apparatus of FIG. 3.

The frame 120 is provided with air inlet pipes 230 in wall 160, adjacent to the upper edge thereof, and air outlet pipes 240 (FIG. 4) mounted in wall 170, adjacent to the lower edge thereof, for drawing air across the heat-collecting sheet 120 transverse to the corrugations. It is noted that inlet pipes 230 are disposed above sheet 120 and outlet pipes 240 are disposed beneath the sheet 120.

Some adjustment of the depth of the corrugations of sheet 190 and the positioning of the lower apex points 122 above the base 130 may be required to achieve optimum air flow; however, this can be readily achieved by those skilled in the art.

It is clear that the fibrous sheet heat collector, particularly the corrugated version 190 thereof, is an efficient heat collector which provides maximum surface area exposed to the sun's rays.

Figure 5:
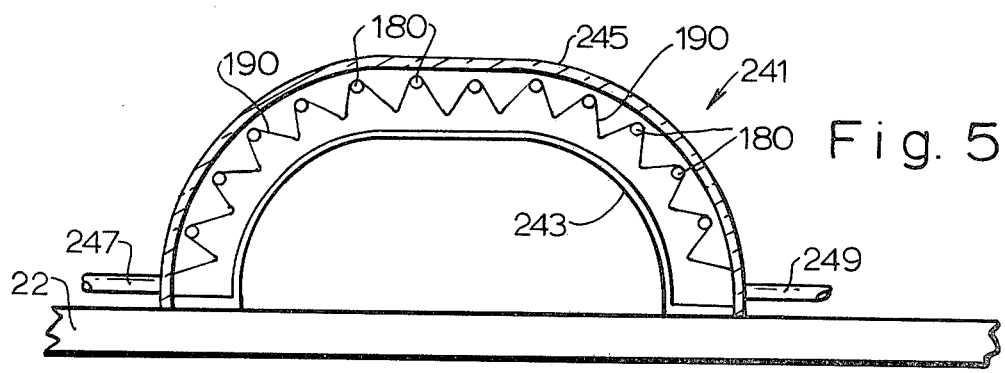
FIG. 5 is a sectional elevational view of another modification of the invention.

In still another modification of the invention illustrated in FIG. 5, the heat collector 241 is generally dome-shaped and includes a curved housing including a convex base 243 having end walls (not shown), to which the support members 180 are secured. The sheet 190 is supported on the members 180 in corrugated form, as in FIG. 3. If desired, a glass or other suitable cover plate 245 may be provided, and air inlet and outlet pipes 247 and 249 are provided at opposite sides of the housing and positioned to draw air across and through the sheet 190.

Figure 6:
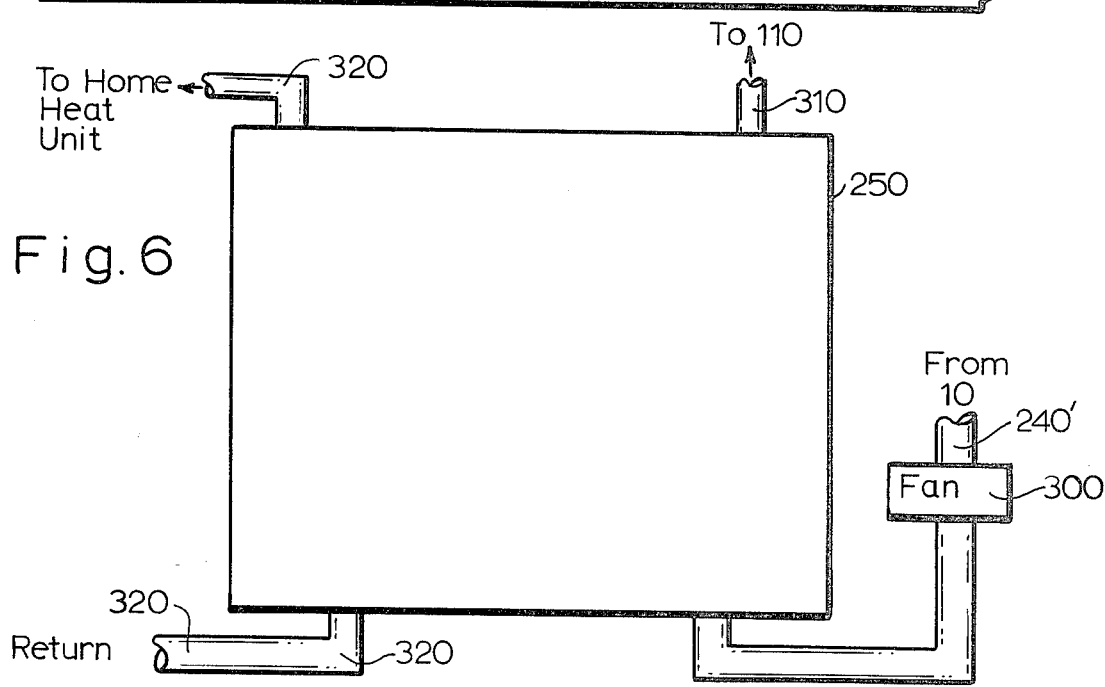
FIG. 6 is a schematic representation of heat storage apparatus used in the invention.
Figure 7:
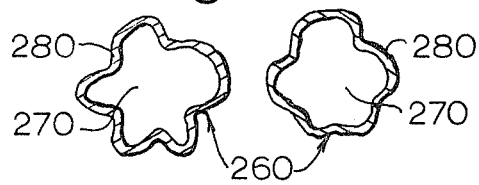
FIG. 7 is a sectional view of crystals used in the invention.

The heat storage apparatus inside the building comprises (FIG. 6), according to the invention, a chamber 250 which contains a suitable number of heat-absorbing elements 260 (FIG. 7), each of which preferably comprises a eutectic crystal coated with a layer 280 of a metal such as copper, plastic, or any other suitable material. The crystal material may be any suitable compound of eutectic crystals.

The chamber 250 receives air flow from the heat conductor pipes 240 of the heat collector 110 which are coupled together into a single pipe or tube 240'. A fan 300 is provided in the single line 240'. Another pipe 310 acts as a return to the inlet pipes 230 of collector 110. Similar piping 320 is provided to conduct heat from the storage chamber 250 to the rooms of the building and then back to the storage chamber. Suitable baffling is provided in the heat storage unit to efficiently direct the flow of the air to and from the collectors and also to and from the rooms to be heated or cooled.

The contents of the storage apparatus operate as follows. When heat is conducted thereto for storage, the crystals 270 contained within the metallic coating 280 absorb heat and become fluid. The heat is stored in this form. When heat is removed from the storage chamber, the heat is given up by the crystals and, at some temperature, they return to their crystalline form. The irregular shape of the crystals and their small size provide a large surface area per volume of storage. The irregular shape of the coated crystals also cause turbulence of the air flow and thus increase the heat exchange efficiency.

The apparatus of the invention has the advantage that it is extremely efficient, due to the presence of the unique heat-absorbing fibrous sheet and the unique heat-storing crystals.

Figure 8:
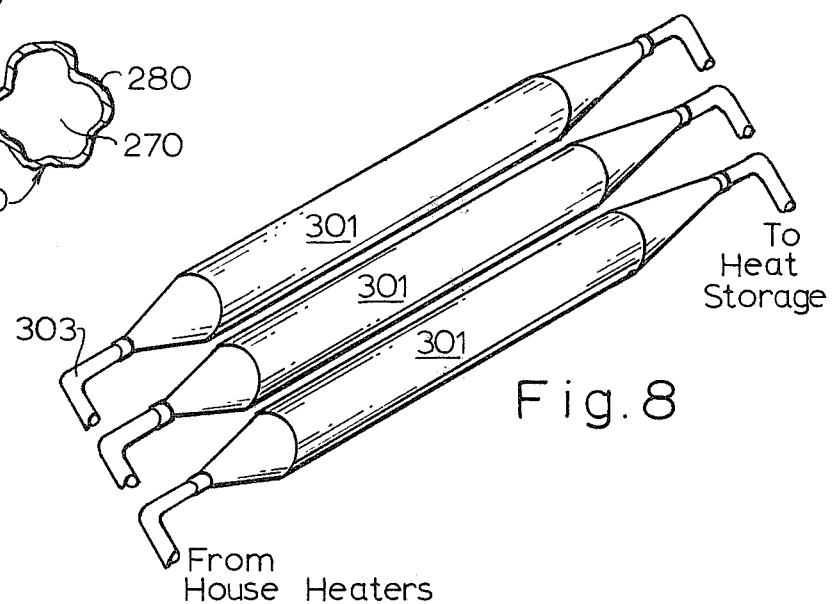
FIG. 8 is a perspective view of a modification of the invention.
Figure 10:
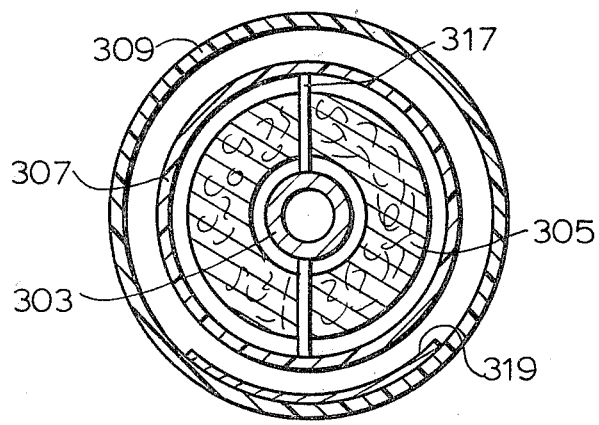
FIG. 10 is a sectional view through one of the heat collectors of FIG. 8.

In another modification of the invention illustrated in FIGS. 8-10, the system includes a plurality of tubular heat collectors 301 disposed on a roof facing the sun. Each heat collector 301 includes a central pipe 303, through which a heat-transmitting fluid, such as air, flows from the house heaters or storage unit 54 and back to the storage unit in the direction of the arrows. The pipe is blocked at the inlet end by a wall 316. The pipe is provided with a plurality of apertures 315 along its length, through which air can flow. The pipe 303 is surrounded by a heat-absorbing cylinder 305 of black fibrous material of the type described above. The cylinder 305 is held in place and supported by one or more rigid wire frame members 317 disposed along the length of pipe 303. Surrounding the fibrous cylinder 305 are two tubular layers 307 and 309 of a clear, flexible, synthetic resinous material such as Tedlar, the ends of which are drawn down and suitably clamped or otherwise secured to the pipe 303 in any suitable manner.

A small hole 311 of about one inch in diameter is provided in the inner layer of Tedlar at one end, say the inlet end, and a smaller hole 313 is provided in the same layer near the opposite end. Air flows through holes 315 at the inlet end inwardly of the ends of layers 307 and 309 and through the holes 311 and 313 and between the two layers 309 and 307 to hold them spaced apart from each other and from the cylinder 305.

A layer 321 of thermally reflective metal, or the like, is provided on the inner surface 323 of the outer tubular film layer 309 and covering the lower half or third of this surface, as required for optimum reflectivity.

The advantage of the tubular construction is that, at more oblique angles of the sun in its east to west path, the rays will hit perpendicular to some part of the tube and be more effective than rays which strike obliquely the flat-plate type collector, such as that shown in FIG. 1. Other advantages include less tendency to collect dust, rain, snow, debris, and greater economy in fabrication than other forms. It is noted that the provision of two spaced sheets of material, such as sheets 307 and 309, helps to minimize the amount of long-wave emission from the black fibrous cylinder 305 as it is heated.

The flow of air in the tubular heat collectors 301 is from the building heaters, through apertures 315 in pipe 303 to the left of wall 316, between layers 307 and fibrous cylinder 305, and through the body of cylinder 305 into pipe 303 through openings 315 and continuing through pipe 303 to the heat storage apparatus in the building.

Figure 11:
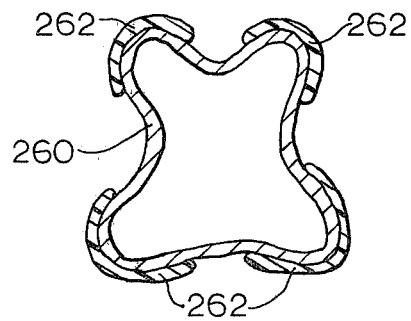
FIG. 11 is a sectional view of a modification of the crystal of FIG. 7.

In a modification of the heat storage crystals 260, the points of the crystals (FIG. 11) are coated with layers 262 of synthetic resinous material to help them maintain their shape and their porosity so that heat transfer is optimized.

In still another modification of the invention shown in FIGS. 12-14, the heat collector 320, to be placed on the roof of a building, comprises an assembly of a plurality of generally tubular members 322 made up of an upper hemispherical portion 326 made of a clear synthetic resinous material, such as Tedlar, and a lower hemispherical portion 330 which is heat-reflective and may be of aluminized Mylar. The two hemispherical portions are suitably secured together to form cylinders which are filled with heat-absorbent black fibrous material 340.

The mechanical structure shown may be made in any suitable fashion, either from individual cylinders or from two shaped sheets having hemispherical portions formed therein (FIG. 13) and secured together along the aligned regions 333 between hemispherical portions where the sheets contact each other.

The assembly of cylinders is seated on and, if desired, secured to a supporting insulating substrate 350 of urethane or the like. If desired, as illustrated, a pipe 360 for receiving air or water may be disposed within each of the cylinders, the pipe being preferably of a synthetic resinous material.

A manifold 366 is secured to each end of the cylinders, the manifold having an aperture aligned with each of the cylinders, with the cylinders or pipes 360 all feeding into a common fluid flow pipe 370. One of the manifolds is coupled to suitable piping leading to the heat storage apparatus or to a suitable location within a building, without the use of storage units, and the other is coupled to the return from the building. Intake and exhaust ducts may be offset in their connection to the assembly, if desired.

According to the invention, a plurality of cylinders 322, as shown in FIGS. 12 and 13, may form a unit, and a group of units may be coupled together as required for each particular installation.

In still another arrangement, shown in FIG. 14, the individual cylinders 322 of FIG. 12 may be replaced by a single relatively large tubular structure 371 comprising an upper clear plastic film 372 and a lower reflective plastic film 374, with the inner space being filled with fibrous heat-absorbing material 380. Suitable manifolds (not shown) may be provided at the ends of the structure 370 to withdraw heat therefrom. The sealed edges of film 373 are tabs for securing the collector to a roof or the like.

Figure 15:
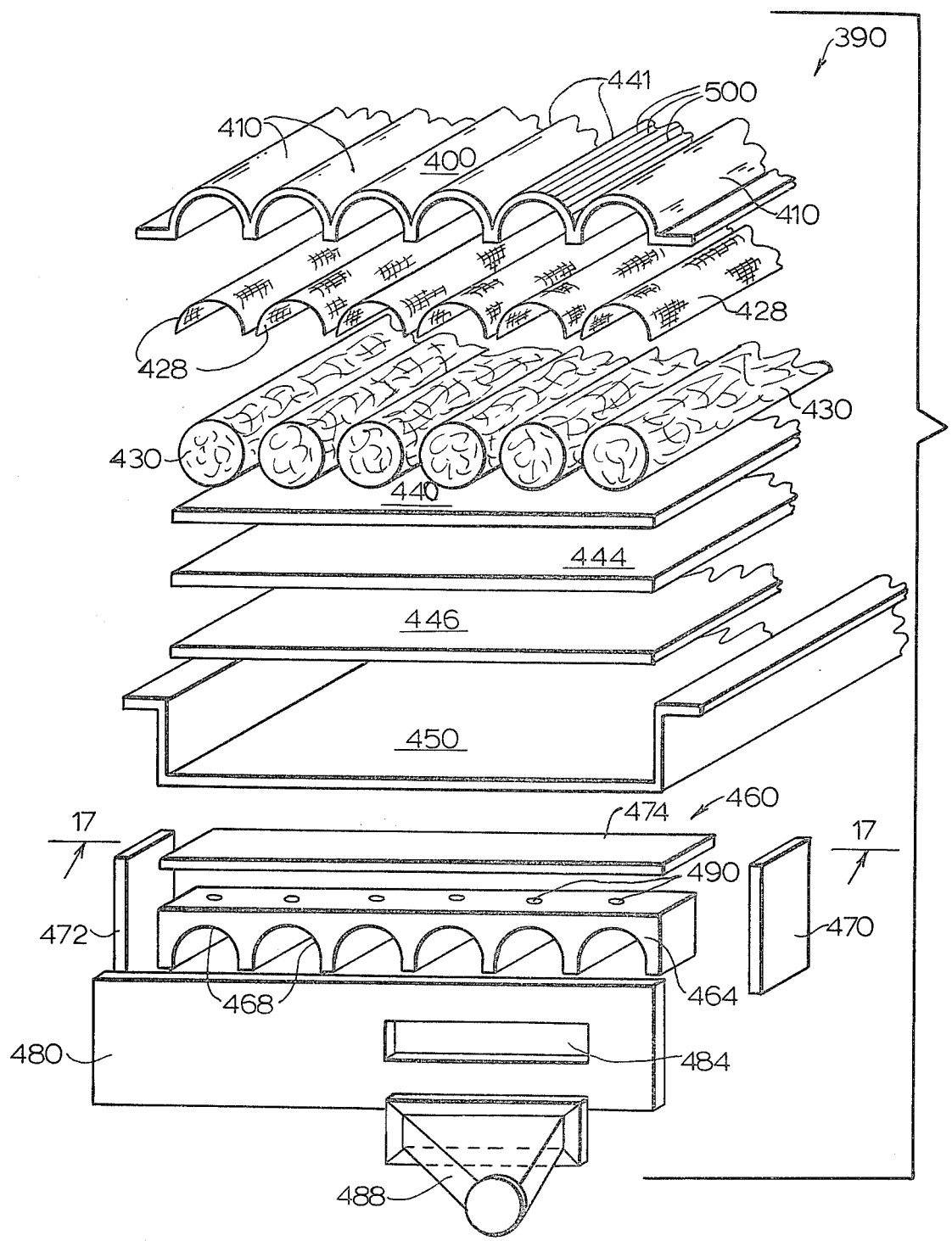
FIG. 15 is an exploded view of still another modification of the invention.
Figure 16:
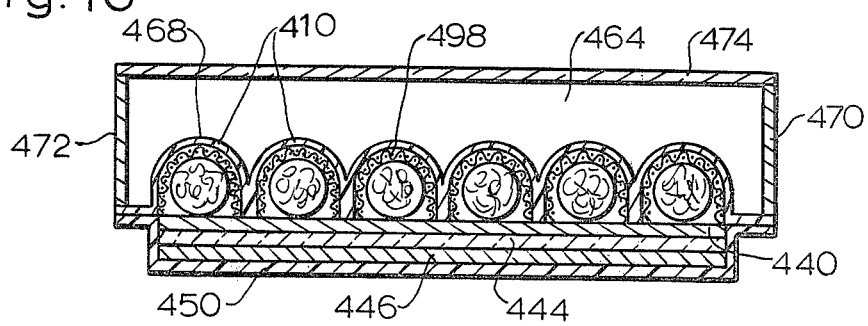
FIG. 16 is a sectional view of the apparatus of FIG. 15 shown assembled.

Another assembly 390 illustrating a modification of the invention, referring to FIGS. 15 and 16, includes a top sheet 400 of synthetic resinous material, such as Tedlar, transparent to solar radiation. The sheet 400 is formed into a plurality of corrugations or hemispherical tubes 410. The top sheet is supported, if necessary, on wire mesh forms 428, and black, fibrous heat-absorbent material, such as coated aluminum wool 430, fills each tube 410. The foregoing structural members are supported on a layer of reflective foil 440, coated with a flat black paint on the upper surface. Below this layer 440 is a layer 444 of insulating material and another layer of reflective foil 446 which is unpainted. Finally, there is a bottom layer 450 of Tedlar or the like sealed at their aligned edges to the top sheet 400. Foil 440 is secured to top sheet 400 at each joint 441 between the tubes 410.

Figure 18:
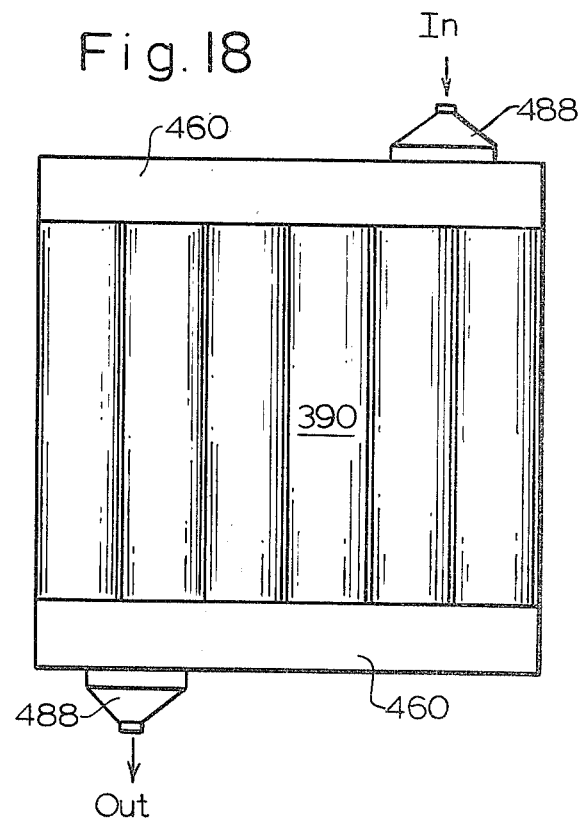
FIG. 18 is a plan view of the apparatus of FIG. 16.

The assembly 390 is provided with a novel manifold assembly 460 at each of its opposite ends, one being an air inlet and the other being an air outlet. Each manifold includes a plate 464 having a series of semi-circular openings 468 which seat on the hemispherical tubes 410. The plate 464 is secured to side plates 470 and 472 and a top plate 474. A front plate 480 is secured to the front edges of the side plates 470 and 472 to provide a closed box with an air flow chamber present between the front plate 480 and the back plate 464. The front plate 480 is provided with an aperture 484, to which is secured a duct 488 of sheet metal or the like. The apertures 484 in the plates 480 are formed so that, when the assembly is complete, the air inlet and air outlet ducts 488 are offset (FIG. 18) at diagonally opposite corners of the assembly to optimize air flow through the assembly.

Each manifold is suitably secured to one end of the sealed assembly, and, in one arrangement, nails 490 are secured through the rigid member and into the sheets beneath it.

Figure 17:
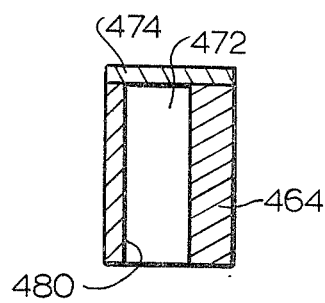
FIG. 17 is a sectional view through the apparatus of FIG. 16.

In operation of the apparatus of FIGS. 15–17, air flows into the assembly at one end and is distributed along the manifold in the space between the front and rear plates, through the black wool in the tubular hemisphere where heat is picked up, and then it flows out of the assembly at the opposite end.

Figure 19:
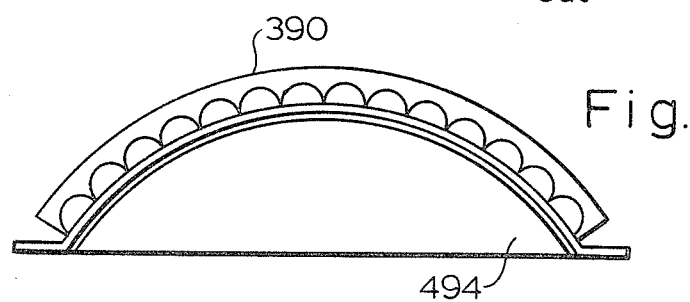
FIG. 19 is a side elevational view of another modification of the invention.

FIG. 19 shows a modification of the invention where the manifold 460 is suitably curved, and the entire assembly 390 is laid over a Styrofoam form 494 for installation, to produce a total hemispherical solar collector surface instead of a flat collector. This configuration is more efficient in collecting solar energy at low angles of sunlight.

It is noted that the air space 498 between top sheet 400 and fiber tubes 440 permits rapid circulation of air along the fibrous tubes 440 and reduces convection current heat losses. This air space 498 is maintained by the pressure of air flow through the assembly.

If desired, solar heat absorption may be further improved by providing a Fresnel lens on the outer surface of each tube 410, as illustrated by longitudinal lines 500 in FIG. 15.

Another modification of the invention shown in FIG. 20 comprises a solar energy collector which is constructed on a form or base 506 of Styrofoam or other material which is insulating but has structural rigidity. The form has a generally hemispherical cross-section and may be considered to be like a portion of the wall of a cylinder. The form has a plurality of air holes 508 which extend therethrough, and its top surface 510 is provided with a plurality of slots 512 which extend along the length thereof. A layer 514 of aluminum or the like is provided on the top surface 510 of the form 506, fitted into the slots 512 and having holes 516 aligned with the through holes 508. The aluminum layer 514 has a heat absorptive outer surface and a heat reflective inner surface for optimum efficiency. A layer or sheet 518 of dark-colored fiber, like those described above, is disposed on layer 514, and a sheet 520 of glazing is disposed over fibrous layer 518, supported and spaced therefrom by means of insulating spacer plates 522 disposed in the slots 512. Suitable manifolds are provided at the ends of the collector 504.

In operation of this modification of the invention, air flows from the space 524 above fibrous layer 518 through the fibrous layer and the holes in layer 516 and 508 in the form 506 to the space 526 beneath the lower surface 528 of the form and then remotely to the heat storage apparatus.

Modifications in the specific structures described above will occur to those skilled in the art within the scope of the invention. For example, in the collector 10, shown in FIG. 1, and in all of the apparatus shown, maximum insulation is provided to minimize heat loss. In FIG. 1, a layer(s) of insulation (not shown) may be provided on the inside or outside of frame 20. All insulation would be properly colored. Also, insulating and reflective sheets could be placed on the roof which supports the heat collector.

In addition, inlet and outlet manifolds may be of any suitable form and may include any number of inlet and outlet pipes.

It is noted that a corrugated heat collector provides not only maximum surface area, but there are also reflections, from surface to adjacent surface, to increase efficiency. In addition, it is noted that a fibrous heat collector causes turbulence in the air that flows through it, and this also increases efficiency.

Fans for producing air flow are also assumed to be placed where they perform in optimum fashion.

In the collector of FIG. 12, a cover plate may be provided to form a dead air space above tubes 322, and ducts may be provided therein for night-time radiation and cooling of a building in summer.

In the collector of FIG. 14, tubes like tube 360 in FIG. 12 may be provided for air ducting.

What is claimed is:
1. A solar energy heat collector comprising
  a curved rigid insulating form having a top surface and a bottom surface and having a plurality of through holes,
  a plurality of slots extending along the top surface of said form,
  a first layer of heat-absorptive material on the top surface of said form and having holes aligned with said through holes,
  a second layer of fibrous, heat-absorptive material on said first layer,
  a sheet of material, which transmits solar energy, spaced from said second layer to provide an air space, and
  means disposed in said slots and supporting said sheet spaced from said fibrous layer.
2. A heat collecting system comprising
  a support member disposed to receive the sun's rays,
  a heat absorbing member disposed adjacent to said support member, said heat absorbing member comprising a layer of a fibrous material which is dark in color to promote heat absorption, means in operative relation with said heat absorbing member for passing air thereacross and therethrough for removing heat absorbed thereby and for transmitting such heat to a remote location, a heat storage chamber at a remote location and coupled to said last-named means, and eutectic crystals disposed within said storage chamber, said crystals being adapted to store heat and to give up such stored heat, said crystals being irregular in shape and coated with a layer of a metal.

3. The apparatus defined in claim 2 wherein the sharp points of said crystals are coated with a layer of synthetic resinous material.

4. A solar energy heat collector comprising a frame including a first base member and a second upper member spaced from base member to provide an air space between them, said second member having a top surface and a bottom surface and having a plurality of through holes, a plurality of slots extending along the top surface of said upper member, a first layer of heat-absorptive material on the top surface of said upper member and having holes alonged with said through holes, a second layer of fibrous, heat-absorptive material on said first layer, a sheet of material, which transmits solar energy, spaced from said second layer to provide an air space, and means disposed in said slots and supporting said sheet spaced from said fibrous layer.

5. The apparatus defined in claim 4 wherein said means comprises a plurality of rigid spacer members seated in said slots and extending along the length of said frame.

* * * * *